United States Patent
Lasserre et al.

(10) Patent No.: US 6,766,421 B2
(45) Date of Patent: Jul. 20, 2004

(54) FAST HARDWARE LOOPING MECHANISM FOR CACHE CLEANING AND FLUSHING OF CACHE ENTRIES CORRESPONDING TO A QUALIFIER FIELD

(75) Inventors: Serge Lasserre, Frejus (FR); Gerard Chauvel, Antibes (FR)

(73) Assignee: Texas Instruments Incorporated, Dallas, TX (US)

( * ) Notice: Subject to any disclaimer, the term of this patent is extended or adjusted under 35 U.S.C. 154(b) by 314 days.

(21) Appl. No.: 09/932,363

(22) Filed: Aug. 17, 2001

(65) Prior Publication Data

US 2002/0065980 A1 May 30, 2002

(30) Foreign Application Priority Data

| Aug. 21, 2000 | (EP) | ............................................ | 00402331 |
| Dec. 15, 2000 | (EP) | ............................................ | 00403538 |

(51) Int. Cl.[7] ............................................. G06F 12/00
(52) U.S. Cl. ...................................... 711/135; 711/130
(58) Field of Search ................................ 711/130, 133, 711/134, 135

(56) References Cited

U.S. PATENT DOCUMENTS

| 5,675,763 A | * | 10/1997 | Mogul ........................ 711/135 |
| 5,778,431 A | * | 7/1998 | Rahman et al. ............. 711/135 |
| 5,778,434 A | * | 7/1998 | Nguyen et al. ............. 711/137 |
| 5,809,522 A | * | 9/1998 | Novak et al. ............... 711/118 |
| 5,875,464 A | * | 2/1999 | Kirk ........................... 711/129 |
| 5,974,438 A | | 10/1999 | Neufeld |
| 6,119,167 A | * | 9/2000 | Boyle et al. ................ 709/234 |

FOREIGN PATENT DOCUMENTS

| EP | 0 884 682 A | 12/1998 |
| GB | 2 210 480 A | 6/1989 |
| WO | WO 00 34870 A | 6/2000 |

OTHER PUBLICATIONS

Texas Instruments Incorporated, S/N: 09/187,118, filed Nov. 5, 1998, *Computer Circuits, Systems, and Methods Using Partial Cache Cleaning*.

Texas Instruments Incorporated, S/N: 09/447,194, filed Nov. 22, 1999, *Optimized Hardware Cleaning Function for VIVT Data Cache*.

* cited by examiner

*Primary Examiner*—Kevin Verbrugge
(74) *Attorney, Agent, or Firm*—Robert D. Marshall, Jr.; W. James Brady, III; Frederick J. Telecky, Jr.

(57) ABSTRACT

A digital system is provided with a several processors, a private level one (L1) cache associated with each processor, a shared level two (L2) cache having several segments per entry, and a level three (L3) physical memory. The shared L2 cache architecture is embodied with 4-way associativity with corresponding tag arrays (502(n)), four segments per entry and four valid and dirty bits. Each tag entry (1236) includes task-ID qualifier field (522) and a resource ID qualifier field (520). Data is loaded into various of lines (506) in the cache in response to cache access requests when a given cache access request misses. After loading data into the cache in response to a miss, a tag (1236) associated with the data line is set to a valid state (526). In addition to setting a tag to a valid state, qualifier values are stored in qualifier fields (520, 522) in the tag. Each qualifier value specifies a usage characteristic of data stored in an associated data line of the cache. In response to an operation command (1251), each tag in the array of tags that contains a specified qualifier value is modified (1258) in accordance with the operation command. Various types of operation commands can be included in an embodiment of the invention, such as clean, flush, clean-flush, lock, and unlock, for example.

27 Claims, 9 Drawing Sheets

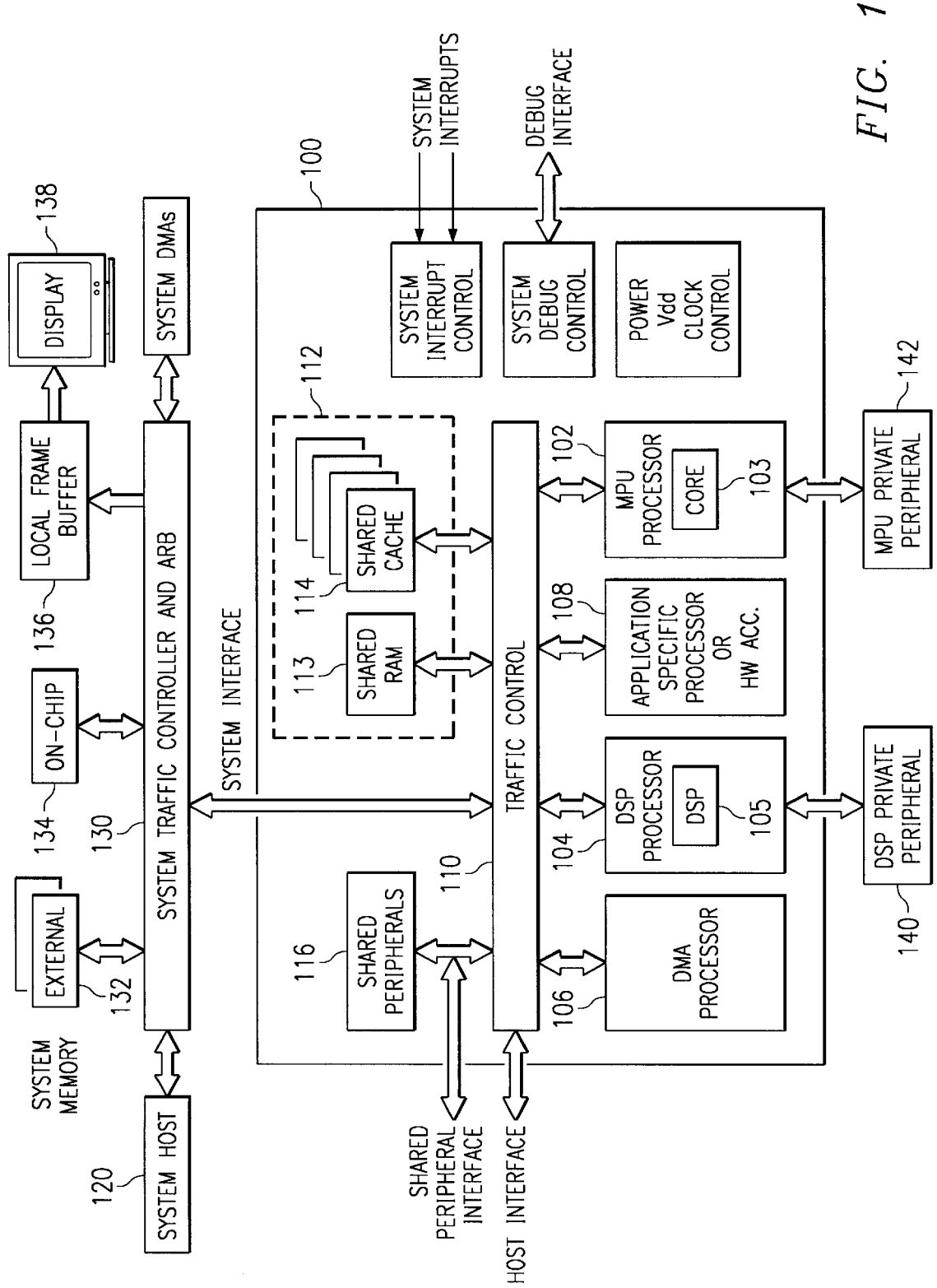

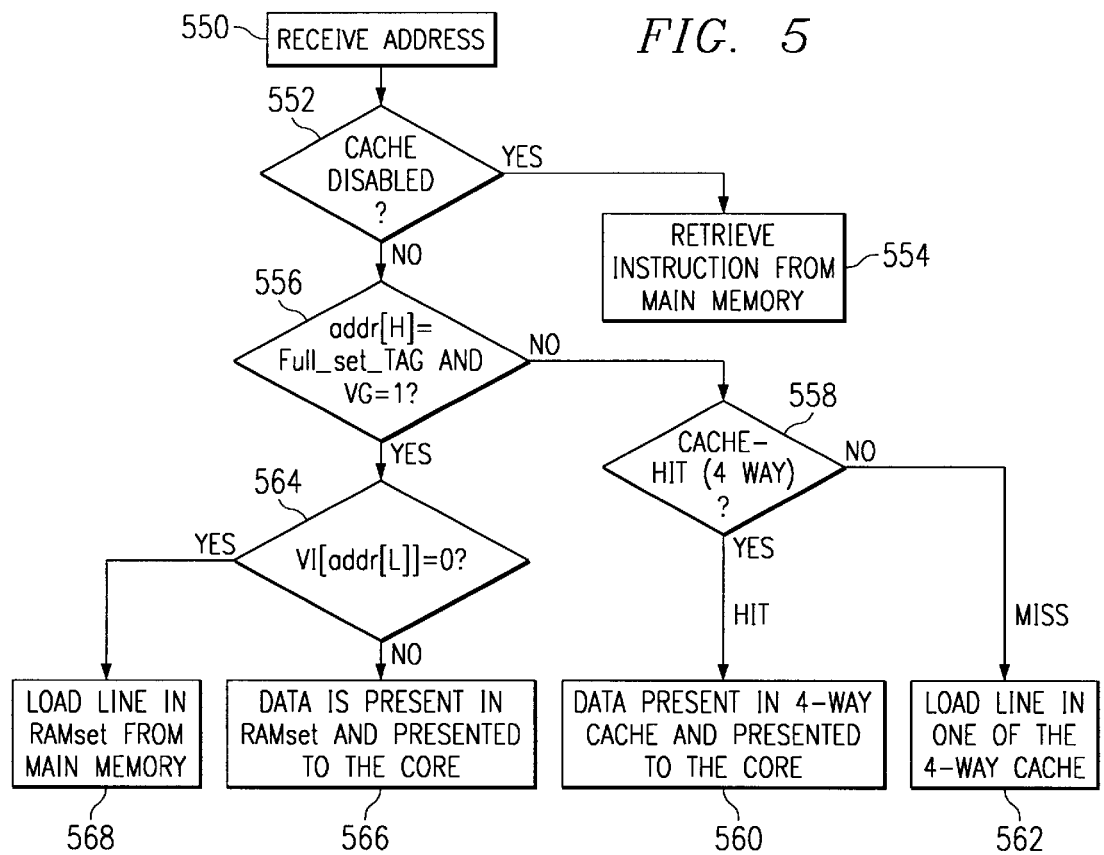
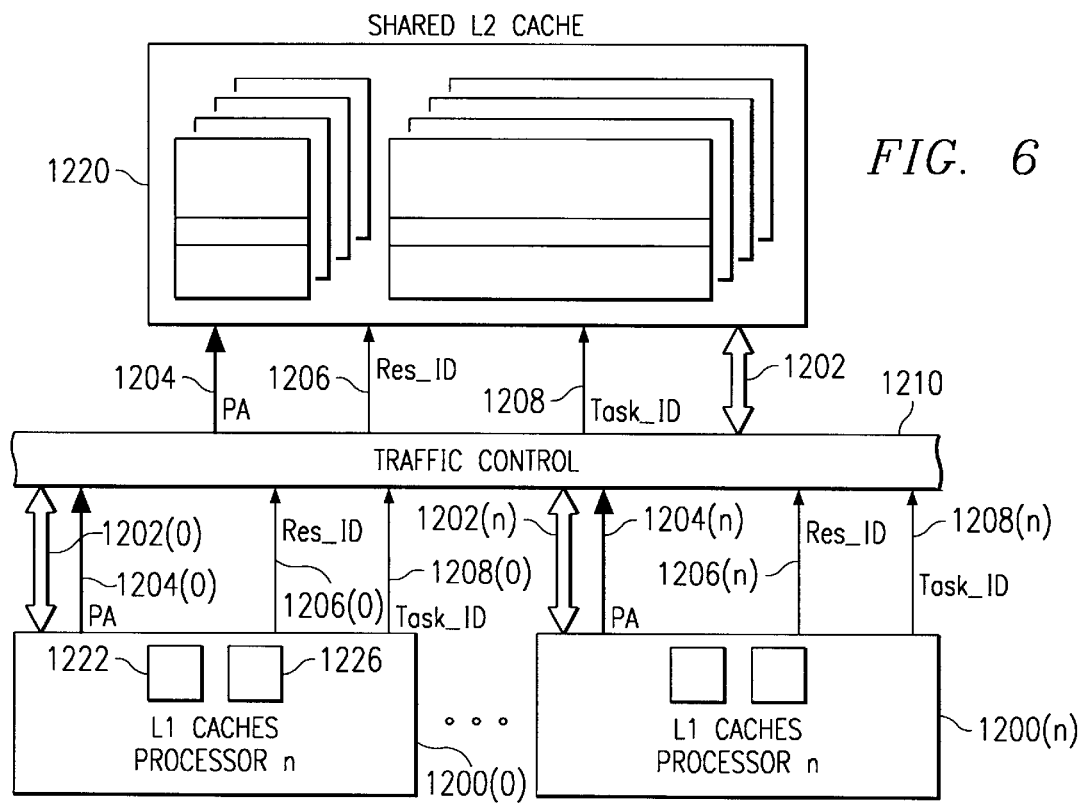

FAST HARDWARE LOOPING MECHANISM FOR CACHE CLEANING AND FLUSHING OF CACHE ENTRIES CORRESPONDING TO A QUALIFIER FIELD

This application claims priority to European Patent Application Serial No. 00402331.3, filed Aug. 21, 2000 and to European Application Serial No. 00403538.2, filed Dec. 15, 2000. U.S. patent application Ser. No. 09/932,651 is incorporated herein by reference.

FIELD OF THE INVENTION

This invention generally relates to microprocessors, and more specifically to improvements in cache memory access circuits, systems, and methods of making.

BACKGROUND

Microprocessors are general purpose processors which provide high instruction throughputs in order to execute software running thereon, and can have a wide range of processing requirements depending on the particular software applications involved. A cache architecture is often used to increase the speed of retrieving information from a main memory. A cache memory is a high speed memory that is situated between the processing core of a processing device and the main memory. The main memory is generally much larger than the cache, but also significantly slower. Each time the processing core requests information from the main memory, the cache controller checks the cache memory to determine whether the address being accessed is currently in the cache memory. If so, the information is retrieved from the faster cache memory instead of the slower main memory to service the request. If the information is not in the cache, the main memory is accessed, and the cache memory is updated with the information.

Many different types of processors are known, of which microprocessors are but one example. For example, Digital Signal Processors (DSPs) are widely used, in particular for specific applications, such as mobile processing applications. DSPs are typically configured to optimize the performance of the applications concerned and to achieve this they employ more specialized execution units and instruction sets. Particularly in applications such as mobile telecommunications, but not exclusively, it is desirable to provide ever increasing DSP performance while keeping power consumption as low as possible.

To further improve performance of a digital system, two or more processors can be interconnected. For example, a DSP may be interconnected with a general purpose processor in a digital system. The DSP performs numeric intensive signal processing algorithms while the general purpose processor manages overall control flow. The two processors communicate and transfer data for signal processing via shared memory. A direct memory access (DMA) controller is often associated with a processor in order to take over the burden of transferring blocks of data from one memory or peripheral resource to another and to thereby improve the performance of the processor.

SUMMARY OF THE INVENTION

Particular and preferred aspects of the invention are set out in the accompanying independent and dependent claims. In accordance with a first embodiment of the invention, there is provided a method of operating a digital system that has a cache with an array of data lines with an associated array of tags. Data is loaded into various of lines in the cache in response to cache access requests when a given cache access request misses. After loading data into the cache in response to a miss, a tag associated with the data line is set to a valid state. In addition to setting a tag to a valid state, a qualifier value is stored in a qualifier field in the tag. The qualifier value specifies a usage characteristic of data stored in an associated data line of the cache. In response to an operation command, each tag in the array of tags that contains a specified qualifier value is modified in accordance with the operation command. Various types of operation commands can be included in an embodiment of the invention, such as clean, flush, clean-flush, lock, and unlock, for example.

The qualifier field in the present embodiment represents a task-ID indicative of a software task that requested the associated data. There is a second qualifier field that represents a resource-ID indicative of a hardware resource that requested the data.

In another embodiment, there may be other qualifiers, such as a qualifier field that indicates the data is shared, for example.

In another embodiment, separate valid bits are associated with the address field and the qualifier field of the tag. If a qualifier field valid bit is not set, then the qualifier field is ignored.

In another embodiment, a digital system is provided with a cache that has a data array with a plurality of lines for holding data and a tag array having a plurality of lines for holding a plurality of tags. Each line of the tag array is associated with a particular line of the data array and each line of the tag array contains an address field and a qualifier field. Control circuitry is arranged to select a tag and then examine the qualifier field of the selected tag. The control circuitry can than modify the tag in response to an operation command, such as clean, flush, clean-flush, lock, and unlock, for example. The control circuitry receives a specified qualifier value from a given operation command and only modifies tags in which the qualifier field matches the specified qualifier value.

The cache is a level two cache, but in other embodiments the cache may be a first level or a higher level cache. In another embodiment, there are additional qualifier fields and additional comparison circuitry to compare the additional qualifier field(s) to specified qualifier values.

In another embodiment, a first level cache embodying the present invention may make requests to a second level cache that also embodies the present invention.

BRIEF DESCRIPTION OF THE DRAWINGS

Particular embodiments in accordance with the invention will now be described, by way of example only, and with reference to the accompanying drawings in which like reference signs are used to denote like parts and in which the Figures relate to the digital system of FIG. 1 and in which:

FIG. 1 is a block diagram of a digital system that includes an embodiment of the present invention in a megacell core having multiple processor cores;

FIG. 5 is a flow chart illustrating operation of the hit/miss logic of the configurable cache of FIG. 4;

FIG. 6 is a more detailed block diagram illustrating various interconnections between processors and the L2 cache of FIG. 1;

Corresponding numerals and symbols in the different figures and tables refer to corresponding parts unless otherwise indicated.

DETAILED DESCRIPTION OF EMBODIMENTS OF THE INVENTION

Figure 2A:
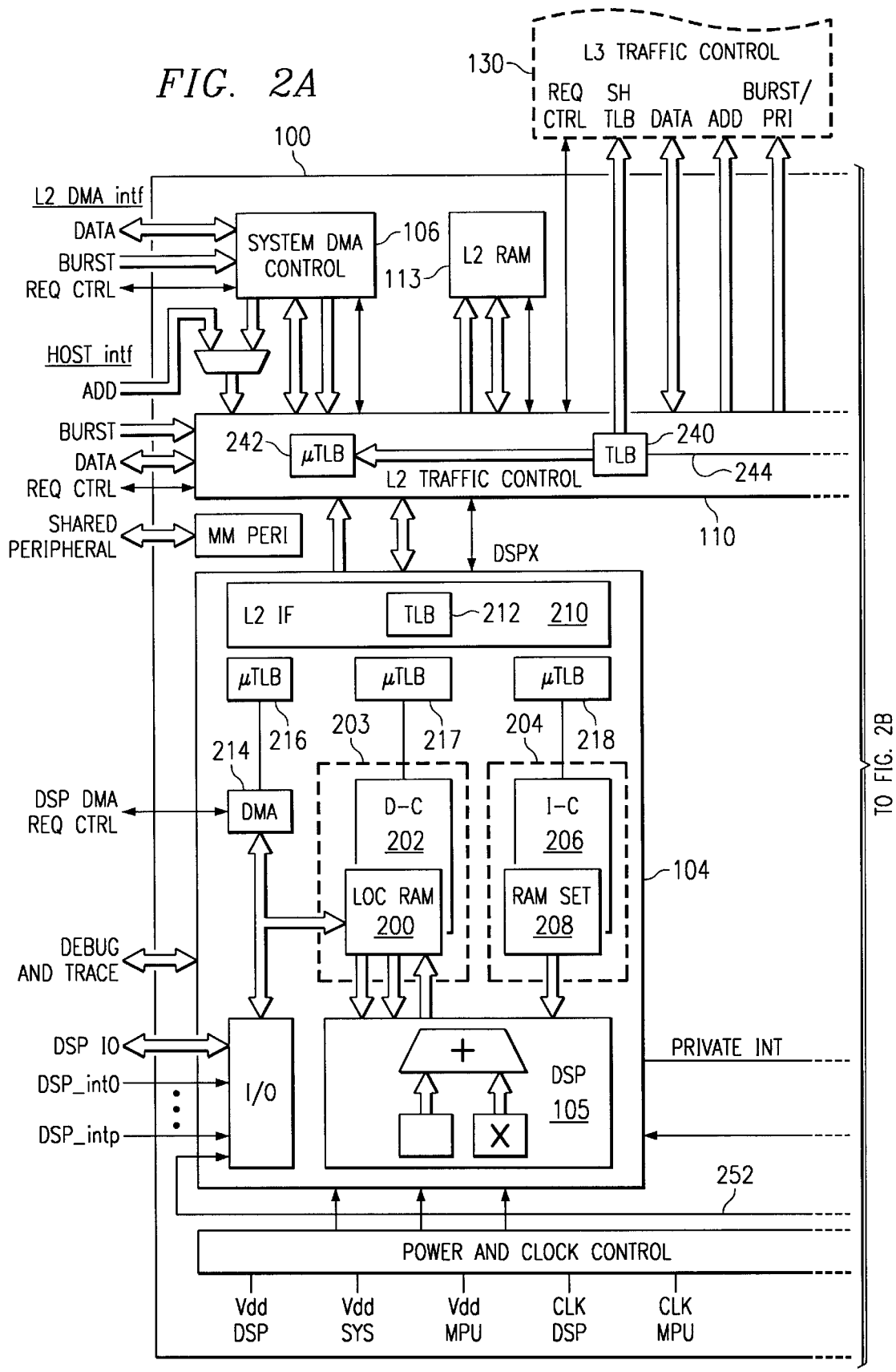
FIGS. 2A and 2B together is a more detailed block diagram of the megacell core of FIG. 1.

Although the invention finds particular application to Digital Signal Processors (DSPs), implemented, for example, in an Application Specific Integrated Circuit (ASIC), it also finds application to other forms of processors. An ASIC may contain one or more megacells which each include custom designed functional circuits combined with pre-designed functional circuits provided by a design library.

FIG. 1 is a block diagram of a digital system that includes an embodiment of the present invention in a megacell core 100 having multiple processor cores. In the interest of clarity, FIG. 1 only shows those portions of megacell 100 that are relevant to an understanding of an embodiment of the present invention. Details of general construction for DSPs are well known, and may be found readily elsewhere. For example, U.S. Pat. No. 5,072,418 issued to Frederick Boutaud, et al, describes a DSP in detail. U.S. Pat. No. 5,329,471 issued to Gary Swoboda, et al, describes in detail how to test and emulate a DSP. Details of portions of megacell 100 relevant to an embodiment of the present invention are explained in sufficient detail herein below, so as to enable one of ordinary skill in the microprocessor art to make and use the invention.

Referring again to FIG. 1, megacell 100 includes a control processor (MPU) 102 with a 32-bit core 103 and a digital signal processor (DSP) 104 with a DSP core 105 that share a block of memory 113 and a cache 114, that are referred to as a level two (L2) memory subsystem 112. A traffic control block 110 receives transfer requests from a memory access node in a host processor 120, requests from control processor 102, and transfer requests from a memory access node in DSP 104. The traffic control block interleaves these requests and presents them to the shared memory and cache. Shared peripherals 116 are also accessed via the traffic control block. A direct memory access controller 106 can transfer data between an external source such as off-chip memory 132 or on-chip memory 134 and the shared memory. Various application specific processors or hardware accelerators 108 can also be included within the megacell as required for various applications and interact with the DSP and MPU via the traffic control block.

External to the megacell, a level three (L3) control block 130 is connected to receive memory requests from internal traffic control block 110 in response to explicit requests from the DSP or MPU, or from misses in shared cache 114. Off chip external memory 132 and/or on-chip memory 134 is connected to system traffic controller 130; these are referred to as L3 memory subsystems. A frame buffer 136 and a display device 138 are connected to the system traffic controller to receive data for displaying graphical images. Host processor 120 interacts with the resources on the megacell via system traffic controller 130. A host interface connected to traffic controller 130 allows access by host 120 to megacell 100 internal and external memories. A set of private peripherals 140 are connected to the DSP, while another set of private peripherals 142 are connected to the MPU.

Figure 2B:
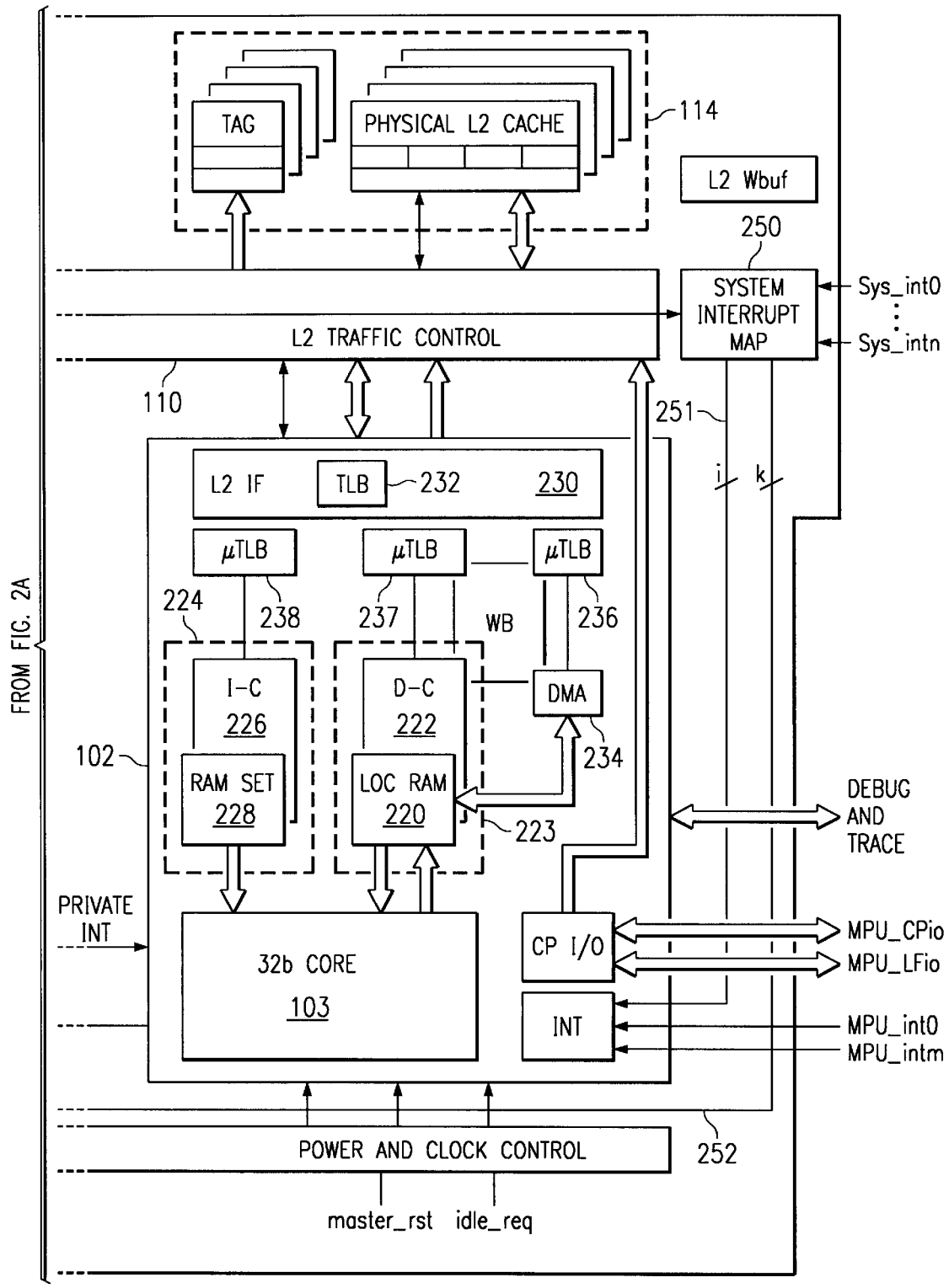

FIG. 2 is a more detailed block diagram of the megacell core of FIG. 1. DSP 104 includes a local memory 200 and data cache 202, a configurable cache 204 that is configured as instruction cache 206 and a block of memory 208, which are referred to as level one (L1) memory subsystems. The DSP is connected to the traffic controller via an L2 interface 210 that also includes a translation look-aside buffer (TLB) 212. A DMA circuit 214 is also included within the DSP. Individual micro TLBs ($\mu$TLB) 216–218 are associated with the DMA circuit, data cache and instruction cache, respectively.

Similarly, MPU 102 includes a local memory 220 and data cache 222, a configurable cache 224 that is configured as instruction cache 226 and a block of memory 228, again referred to as L1 memory subsystems. The MPU is connected to traffic controller 110 via an L2 interface 230 that also includes a TLB 232. A DMA circuit 234 is also included within the MPU. Individual micro TLBs ($\mu$TLB) 236–238 are associated with the DMA circuit, data cache and instruction cache, respectively.

L2 traffic controller 110 includes a TLB 240 and a micro-TLB ($\mu$TLB) 242 that is associated with system DMA block 106. Similarly, L3 traffic controller 130 includes a $\mu$TLB controllably connected to TLB 232 that is associated with system host 120. This $\mu$TLB is likewise controlled by one of the megacell 100 processors.

Memory Management Unit

At the megacell traffic controller level, all addresses are physical. They have been translated from virtual to physical at the processor sub-system level by a memory management unit (MMU) associated with each core, such as DSP core 105 and MPU core 103. At the processor level, access permission, supplied through MMU page descriptors, is also checked, while at the megacell level protection between processors is enforced by others means, which will be described in more detail later.

The TLB caches contain entries for virtual-to-physical address translation and access permission checking. If the TLB contains a translated entry for the virtual address, the access control logic determines whether the access is permitted. If access is permitted, the MMU generates the appropriate physical address corresponding to the virtual address. If access is not permitted, the MMU sends an abort signal via signal group 244 to MPU 102.

Upon a TLB miss, i.e., the TLB does not contain an entry corresponding to the virtual address requested, translation table walk software retrieves the translation and access permission information from a translation table in physical memory. Once retrieved, the page or section descriptor is stored into the TLB at a selected victim location. Because a "load and store multiple" instruction may potentially cross a page boundary, the permission access is checked for each sequential address.

Unpredictable behavior will occur if two TLB entries correspond to overlapping areas of memory in the virtual space. This can occur if the TLB is not flushed after the memory is re-mapped with different-sized pages leaving an old mapping with different sizes in the TLB, and making a new mapping that gets loaded into a different TLB location, for example.

Translation Table

A translation table held in main memory has two levels: a first-level table holds both section translation entries and pointers to second-level tables (either fine tables or coarse tables); second-level tables hold both large, small and tiny page translations entries. The present embodiment has a distributed OS with several domains corresponding to each processor and therefore only a single table manager for all processors. Table update operations are limited to the corresponding R-ID for all slave processors. Access to all could be given to a super OS, such as a communication management OS. The super OS will have right to flush out entries belonging to another processor in a different OS domain. In another embodiment with several independent OSs, for example, there will independent tables. These tables can be located in a memory space only viewed by the OS that they are associated with in order to provide protection from inadvertent modification by another OS.

Translation tables and TLB cache contents must be kept consistent. A flush operation, which will be described later, is provided for this reason.

An address reference is generally located within the $\mu$TLB or main TLB of each processor sub-system; however, certain references, such as those used by system DMA 106 or host processor 120, for example, to access megacell memories can be distributed within L2 traffic controller 110 and cached into L2 system shared TLB 240. Because system performance is very sensitive to the TLB architecture and size, it is important to implement efficient TLB control commands to flush, lock or unlock an entry when a task is created or deleted without degrading the execution of other tasks. Therefore, each $\mu$TLB and L2 cache entry holds a task-ID, also called ASID. During execution, the current task-ID register is compared with the $\mu$TLB entry, this also provides better security, as will be described later. During MMU operation, commands are supplied to flush locked or unlocked entries of a $\mu$TLB corresponding to a selected task.

To provide maximum flexibility, the MMU is implemented as a software table walk, backed up by TLB caches both at the processor sub-system and megacell level. This allows easy addition of new page size support or new page descriptor information if required. A TLB miss initiates an MMU handler routine to load the missing reference into the TLB. At the Megacell 100 level, a TLB miss asserts a miss signal in signal group 244 and is routed via system interrupt router 250 to the processor having generated the missing reference or to the processor in charge of the global memory management, via interrupt signals 251, 252.

The MMU provides cacheability and bufferability attributes for all levels of memory. The MMU also provides a "Shared" bit for each entry to indicate that a page is shared among multiple processors (or tasks). This bit, as standalone or combined with the task-ID, allows specific cache and TLB operation on data shared between processors or/and tasks.

All megacell memory accesses are protected by a TLB. As they all have different requirements in term of access frequencies and memory size, a shared TLB approach has been chosen to reduce the system cost at the megacell level. This shared TLB is programmable by each processor. The architecture provides enough flexibility to let the platform work with either an independent operating system (OS) or a distributed OS with a unified memory management, for example.

The present embodiment supports page size of 1 K, 4 K, 64 K and 1 MB, but other embodiments might have TLB hardware/software supporting other page sizes.

The organization of the data structures supporting the memory management descriptor is flexible since each TLB miss is resolved by a software TLB-miss handler. These data structures include the virtual-to-physical address translation and all additional descriptors to manage the memory hierarchy. In other embodiments, a processor may have other modes that enable access to memory without permission checks.

MMU/TLB Control Operation

Figure 3:
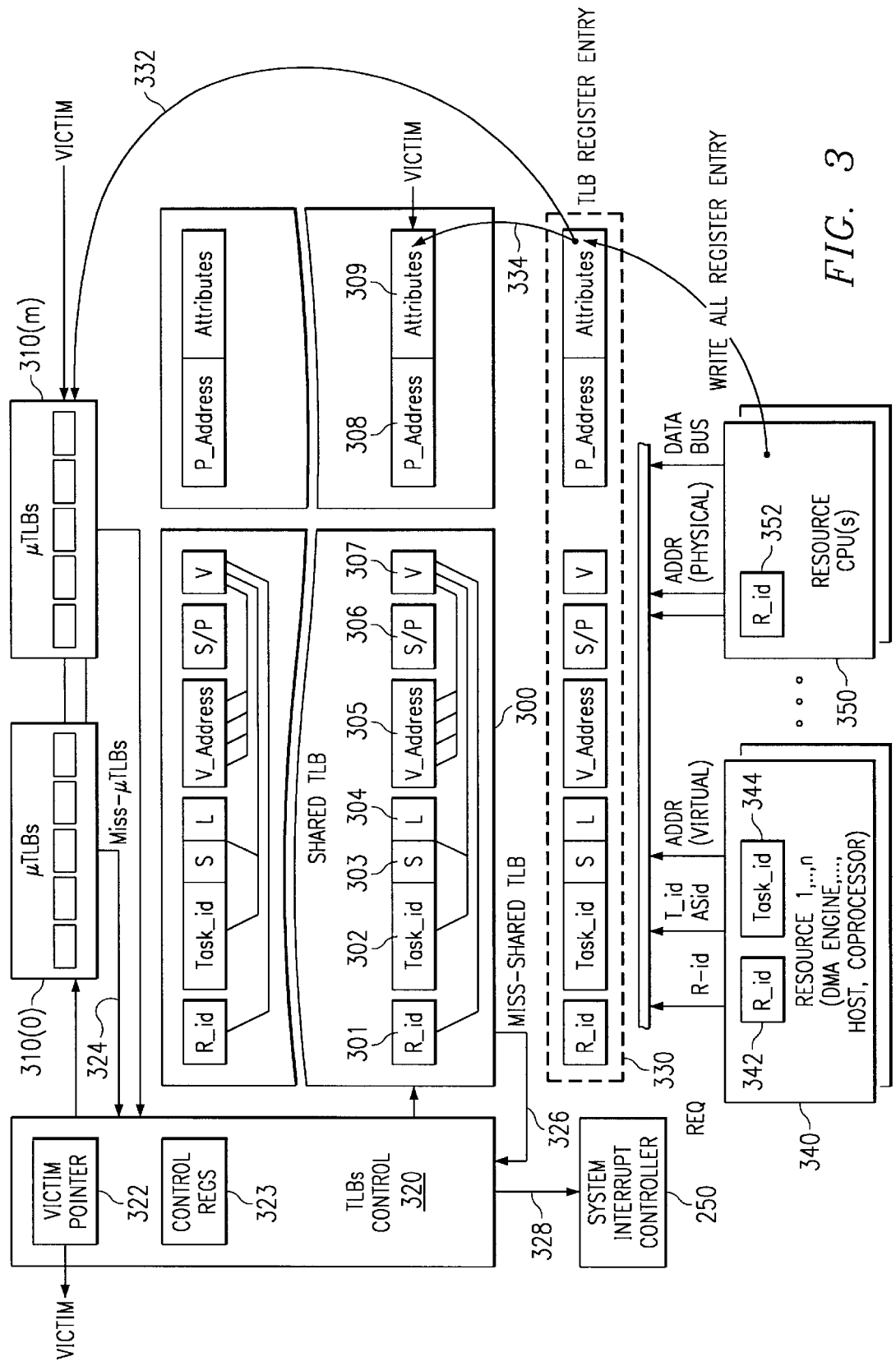
FIG. 3 is a block diagram illustrating a shared translation lookaside buffer (TLB) and several associated micro-TLBs (µTLB) included in the megacell of FIG. 2.

FIG. 3 is a block diagram illustrating a shared translation look-aside buffer (TLB) 300 and several associated micro-TLBs ($\mu$TLB) 310(0)–310(n) included in megacell 100 of FIG. 2. On a $\mu$TLB miss, the shared TLB is first searched. TLB controller 320 is alerted by asserting a $\mu$TLB miss signal 324. In case of a hit on the shared TLB, the $\mu$TLB that missed is loaded with the entry content of the shared TLB 300. In case of miss in shared TLB 300, the shared TLB alerts TLB controller 320 by asserting a TLB miss signal 326. Controller 320 then asserts an interrupt request signal 328 to system interrupt controller 250. Interrupt controller 250 asserts an interrupt to the processor whose OS supervises the resource which caused the miss. A TLB entry register 330 associated with TLB controller 320 is loaded by a software TLB handler in response to the interrupt. Once loaded, the contents of TLB entry register 330 are transferred to both shared TLB 300 and the requesting $\mu$TLB at a selected victim location as indicated by arcs 332 and 334.

A separate TLB entry register 330 is only one possible implementation and is not necessarily required. The separate register TLB entry register is a memory mapped register that allows buffering of a complete TLB entry (more than 32 bits). A TLB value is not written directly in the TLB cache but is written to the TLB entry register first. Loading of a TLB cache entry is then done in a single operation "Write TLB entry".

The sequence of operations to update a TLB cache entry is:

1-write to the TLB entry register,

2-Check and select a TLB entry (victim entry in the TLB cache), and

3-Write TLB entry, which transfers a value from TLB entry register to the selected victim TLB cache entry.

The priority on the shared TLB is managed in the same way as priority on a memory access. One or more resources can be using the shared TLB. One or more resources can program the shared TLB. The replacement algorithm for selecting the next victim location in the shared TLB is under hardware control. A victim pointer register 322 is maintained for each TLB and $\mu$TLB to provide a victim separate pointer for each. A typical embodiment will use a round robin scheme. Another embodiment may use a least recently used scheme. Different TLBs within a single megacell can use different replacement schemes. However, in an embodiment in which the system has a master CPU with a distributed OS, this master CPU could also bypass the hardware replacement algorithm by selecting a victim entry, reading and then writing directly to the Shared TLB.

In this embodiment, each shared TLB has 64 entries. Each $\mu$TLB is generally much smaller, i.e., has fewer entries, than the shared TLB. The penalty for a miss in a µTLB is small since a correct entry is generally available from the shared TLB. Therefore, the present embodiment does not provide direct control of the victim pointers of the various µTLBs; however, direct control of the victim pointer of shared TLBs, such as 212, 232, and 240, is provided.

Each entry in a TLB has a resource identifier 301 along with task-ID 302. Resource-IDs and task IDs are not extension fields of the virtual address (VA) but simply address qualifiers. A task ID is provided by a task-ID register, such as task-ID register 344 associated with processor 340. Resource IDs are provided by a resource-ID register associated with each resource; such as R-ID register 342 associated with processor 340 and R-ID register 352 associated with resource 350. With the task-ID, all entries in a TLB belonging to a specific task can be identified. They can, for instance, be invalidated altogether through a single operation without affecting the other tasks. Similarly, the resource ID is required because task-ID number on the different processors might not be related; therefore, task related operations must be, in some cases, restricted to a resource-ID. At system initialization, all R-ID and Task-ID registers distributed across the system are set to zero, meaning that the system behaves as if there were no such fields.

In another embodiment, The R-ID and Task_ID registers are not necessarily part of the resource core and can be located in the system, such as a memory mapped register for example, and associated to a resource bus. The only constraint is that a task_ID register must be under the associated OS control and updated during context switch. R-ID must be set during the system initialization.

Referring still to FIG. 3, each TLB entry also includes "shared" bit 303 and a lock bit 304. All entries marked as shared can be flushed in one cycle globally or within a task. Each entry also includes a virtual address field 305 and a corresponding physical address field 308 and address attributes 309. An S/P field 306 specifies a section or page size. In the present embodiment, a section is 1 Mbyte, and an encoding allows page sizes of 64 kb, 4 kb and 1 kb to be specified. Naturally, the page size determines how many most significant (ms) address bits are included in a check for an entry. A V field 307 indicates if an associated TLB cache entry is valid. V field 307 includes several V-bits that are respectively associated with R-ID field 301 to indicate if a valid R-ID entry is present, task-ID field 302 to indicate if a valid task-ID entry is present, and virtual address field 305 to indicate if a valid address entry is present.

TLB control register set 330 also includes a Host resource and task ID register to identify a resource ID and task ID that is assigned to a host system, such as host 120 of FIG. 1. There is also a host_master_selection register to enable selection of one of the processors within the megacell, such as MCU 102 or DSP 104, to receive control register accesses and interrupts from the host processor. When an address is missing from the µTLB, it searches the shared TLB. If a miss occurs in both, an interrupt is returned to the processor in charge of the host.

Shared Cache and RAM

Referring again to FIG. 1, Megacell 100 includes large shared memory subsystem 112 that function as a secondary level of RAM (L2 RAM) 113 and cache (L2 Cache) 114. This level of memory is preferably called the outer level, as each processor in various embodiments may have multilevel internal memory. However, for the present embodiment, processors 102, 104 have one level of internal memory, which is referred to herein as L1 within the memory hierarchy, therefore the outer level memory subsystem will be referred to as level two (L2). The megacell outer memory 112 is organized as what's called a SmartCache, which is a configurable cache and which allows concurrent accesses on cache and RAM-set. RAM-set is a block of RAM that has aspects of cache behavior and cache control operations as well as DMA capability. The SmartCache architecture provides predictable behavior and enhanced real-time performance while keeping high flexibility and ease of use. A detailed description of a SmartCache is provided in U.S. patent application Ser. No. 09/591,537, entitled Smart Cache and is incorporated herein by reference. Advantageously, RAM-set configured as a RAM offers fast memory scratch-pad feature.

Megacell "outer" memory 112 can be shared between megacell internal processors and external Host processors or peripherals. RAM usage can also be restricted to the usage of a single processor thanks to the MMU mechanism, described earlier. However, in another embodiment a need might arise in the megacell to add additional physical protection per processor on some part of megacell memory to overwrite the MMU intrinsic protection.

A unified shared cache architecture of this embodiment is a four way set associative cache with segmented lines to reduce system latency. All outer memories are treated as unified instruction/data memory to avoid compiler restrictions such as data in program space or vice-versa. Size of this cache or the degree of associativity is a design choice and may vary in other embodiments of the present invention. General construction of set-associative caches are known and need not be described in detail herein. Typically, L1 caches are 16 kbytes or 32 kbytes, and the L2 cache is 128 kbytes, 256 kbytes or larger, for example. Likewise, the number of associated RAM-sets may vary in other embodiments.

RAM-set control registers, such as control register 531 in cache control circuitry 530 (FIG. 4), are memory mapped and therefore also benefit from the protection provided by the MMU. However, this would force operations on cache or any specific RAM-set to be on separate pages for protection reasons. Therefore, a control register is provided in TLB control register set 323 (FIG. 3) to configure how and by which CPU the various parts of megacell memory are controlled. All CPUs can execute operations such as cache flushing or cache cleaning as these operations will be restricted by a resource identifier field located in the TAG area of the cache.

Figure 4:
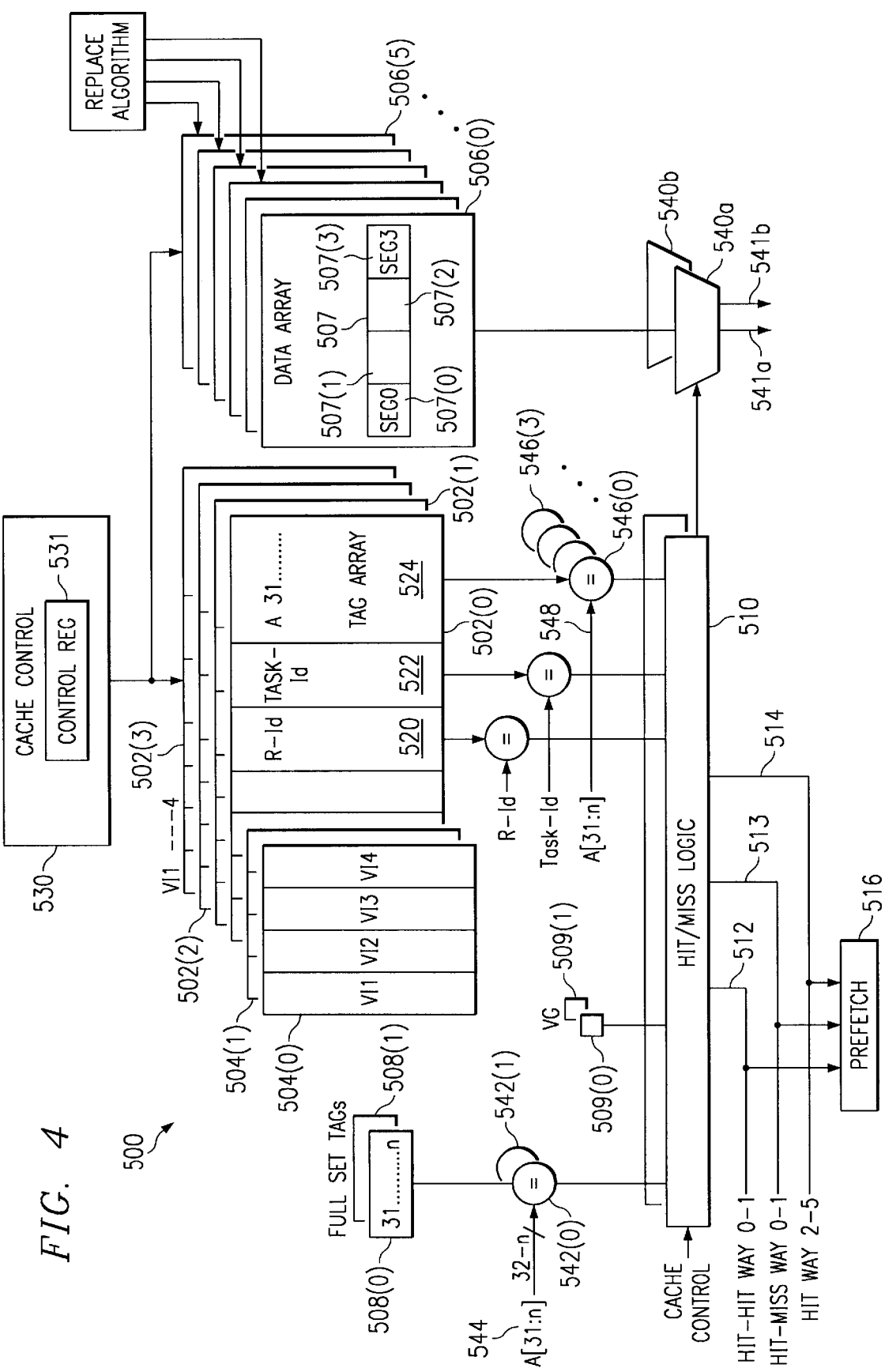
FIG. 4 is a block diagram illustrating a configurable cache that is included in the megacell of FIG. 1 that has a cache and a RAM-set.

FIG. 4 is a block diagram illustrating a representative configurable cache 500 that has a cache representative of L2 cache 114 and a RAM-set representative of shared RAM 113. Configurable cache 500 is also representative of L1 cache 204, 224 that are included respectively in each of the processor modules 102, 104 of FIG. 2. As discussed above, the configurable cache is composed of a 4-way set-associative cache that includes a TAG Array 502(0–3) and Data array 506(2–5) and one or more additional RAM-sets, in this case data arrays 506(0–1). In the present embodiment, data array 506(1–5) are each 32 kbytes, while data array 506(0) is 64 kbytes.

During an access request, each TAG array 502(0–3) provides a tag value to a respective comparator 546(0–3) and is compared against a most significant portion of a proffered address 548. A tag value is stored in tag array 502(0–3) according to an index value that corresponds to a least significant address of a proffered address. Thus, for any proffered address, an associated tag may be found on any one of the four tag arrays. If a tag matches a proffered address, then hit/miss logic 510 asserts a respective hit signal hit-way(2–5) 514. In this embodiment, a resource ID (R-ID) field 520 and a task ID (task-ID) field 522 is also included with each entry in the tag array, along with a set of valid bits VI(1–4). Usage of these fields will be described in more detail later. Prefetch circuitry 516 receives signals 512–514 and forms a request to L3 memory when a miss occurs. For each hit, the requested date is provided via bus 541b to an output port of the cache via cache output buffer 540b.

The RAM-set also includes valid bit arrays 504(0–1) The RAM-set can be configured as a cache extension or as a block of RAM. When configured as RAM, a loading mechanism is provided by a separate DMA engine to optimize data transfer required by multimedia applications. For each hit in the RAM-set portion of the cache, requested data is provided via bus 541a a second output port of the cache via cache output buffer 540a.

Cache control circuitry 530 includes control registers 531 which are used to configure the configurable cache. Fields in the control register include: RAM_fill_mode, Cache_enable, organization, and Full_RAM_base. The control circuitry is coupled to all of the operational blocks of the configurable cache and allows for dynamic reconfiguration of the configurable cache under control of software.

In the embodiment of FIG. 4, the RAM-set has two different sized data arrays, Data array 506(0) is 64 kbytes and Data array 506(1) is 32 kbytes; however, other embodiments may specify all RAM-sets with the same size to simplify the hardware logic and the software model.

Each RAM-set has an associated TAG register, referred to as Full Set Tag 508(0–1) containing the base address of the RAM-set and a global valid bit (VG) 509(0–1) in addition to an individual valid bit contained in valid bit arrays 504(0–1), referred to as VI, for each segment of each segmented line in the associated data array. In the present embodiment, RAM-set lines have the same size as the cache lines; however, in other embodiments a longer line size can also be used to reduce the number of VI bits. RAM-set base registers are coupled with a logical comparison 542(0–1) on a most significant address portion 544 for each access request.

An organization field in cache control register (RAMset-ctrl[n]) 531 for each RAM-set provides the capability to configure it as a cache extension (RAM-set) or as a plain RAM. When configured as a plain RAM, the valid bits are ignored. Table 1 explains other fields in this register.

TABLE 1

| | Cache Control Register |
|---|---|
| Bit[0] | 0 - MPU master. Only the MPU can write to this register |
| | 1 - DSP master. Only the DSP can write to this register |
| Bit[1] | 0/1 RAM-set work as a cache or as a RAM |
| RAM-set master bit | each RAM-set can be controlled by one or the other processor write access to the register base |

A status register provides cache information, including number of RAM-sets, sizes, Cache number of way, and line size.

When configured as a RAM, base address registers 508 (0–1) are programmed such that this memory does not overlap with other memories in the system. Note, the base address register and the full set tag register are the same. This memory space is mapped as non-cacheable at the outer level. RAM control logic (address decode) generates a hit equivalent signal, which prevents the outer cache from fetching the missing data/instruction to the external memory.

VG bit 509(0–1) acts as an enable/disable. It is set when the base address register is written to and cleared when the RAM is invalidated or disabled.

If the register base address of the RAM is programmed in such a way that the associated memory area overlays with the external memory, coherency is not guaranteed by hardware of this embodiment.

When configured as a cache, hit/miss control circuitry 510 generates hit/miss signals called hit-hit 512 and hit-miss 513 for each RAM-set. A hit-hit is generated when a valid entry of the RAM-set matches the address provided by the core. An entry is valid when both VG and its VI are set. A hit-miss signal is generated when the base address of the RAM is valid (VG=1) and matches the most significant portion of an address provided by a processor but the selected entry in the RAM-set has its VI equal to zero.

The hit-miss or hit-hit signal has precedence over the hit way (2–5) signals 524 of the 4-way set-associative cache. This implies that any value loaded previously in the cache that should be in the RAM-set is never selected and will eventually be removed from the cache. However, data can create coherency problem in case of modified data (copy back). Therefore, it is recommended to write back ("clean") or even flush the range of address that will correspond to the RAM-set range of addresses.

FIG. 5 is a flow chart illustrating operation of the hit/miss logic of the configurable cache of FIG. 4. In step 550, an address is received from the processor core in connection with a read operation. If the instruction cache is disabled, which is checked in step 552, the instruction is retrieved from second level memory in step 554. If the cache is enabled, then if either the high order bits of the address from the processor (ADDR[H]) do not match the high order bits of the starting address 508(n) or the global valid bit 509(n) is set to "0" (step 556), the there is a RAM-set miss. In this case, if there is a cache hit in the 4-way set associative cache in step 558, then the information is retrieved from the 4-way set associative cache is presented to the core processor via cache output buffer 540b in step 560. If there is a miss in the 4-way set associative cache, the line is loaded into the 4-way cache from second level memory in step 562.

Returning again to step 556, if both the high order bits of the address from the processor (ADDR[H]) match the high order bits of the starting address 508(n) and the global valid bit 509(n) is set to "1", then there is a RAM-set hit at the line corresponding to ADDR[L], and the valid entry bits are used to determine whether it is a hit-hit situation where the requested instruction is present in the RAM-set and can be presented to the processor, or a hit-miss situation where the requested instruction is mapped to the RAM-set, but the information needs to be loaded into the RAM-set's data array 506(n) from the second level memory. If, in step 564, the individual valid entry bit (VI) 504(n) for the line indicates that the line is valid (VI[ADDR[L]]=1), the data is present in the RAM-set and is presented to the processor through the RAM-set's output buffer 540a in step 566. If, on the other hand, the valid entry bit for the line indicates that the line is not valid (VI[ADDR[L]]=0), the line is loaded into the data array 506(n) of the RAM-set from main memory in step 568.

Cache Features

The unified cache memory of the present embodiment supports write back, and write through with/without write-allocate on a page basis. These controls are part of the MMU attributes. Hit under miss is supported to reduce conflicts between requesters and consequent latency. Concurrent accesses on RAM-sets and cache are supported.

Referring again to FIG. 4, on a cache miss, the segment corresponding to the miss is fetched from external memory first. For this discussion, data array 506(0) will be discussed, although it is actually configured as a RAM-set instead of Cache. All of the data arrays 506(0–5) have the same organization. Each data array has a number of lines, line 507 being representative, which are segmented into four segments 507(0–3) that each hold 16 bytes data or instruction. For example, in L1 cache 224 if a miss occurs in second segment 507(1), the second segment is fetched from second level RAM 113 or cache 114 or from third level memory 132, 134 if the second level misses. Then, the third segment and finally the fourth segment are loaded into segments 507(2) and 507(3) automatically, referred to as automatic hardware prefetch. In this embodiment, first segment 507(0) is not loaded into the cache. This sequence of loads can be interrupted on a segment boundary by a miss caused by a request having higher priority. The interrupted load is not resumed, as the remaining segments will be loaded if required later in response to a new miss.

Likewise, second level cache 114 has a data array with a number of lines that are segmented into four segments that each hold 16 bytes. If second level cache 114 misses, it will be filled from third level memory 132, 134 using a multi-cycle operation in which each segment of a given line is accessed. Multi-cycle operations on second level cache 114 are non-blocking. A Multi-cycle cache operation is launched and a status bit indicates its completion. As operations can be initiated by several requesters, such as DSP 104 and MPU 102, these operations can not be blocking due to real time constraints. If one processor initiates a clean_all_task_ID or a block operation for example, other requests can interleave.

Each cache segment has a valid bit (VI) and a dirty bit (not shown) in tag array 502(0–3). Each line such as 507 also has an associated shared bit (not shown) in the tag array. On a write back when a line is replaced, only the segments with modified (dirty) data are written back. Each RAM-set segment has a valid bit (VI) in tag array 504(0–1).

In this embodiment, RAM-sets do not have Task_ID and R-ID fields and shared bit markers associated with each line. Operations on task_ID, R-ID, data marked as shared are limited to the cache. However, another embodiment may harmonize the RAM-set and cache. The hit logic of second level cache 114 only uses the address field. Task-Id and R-Id are used in task operations only.

In this embodiment, L1 caches 202, 206, 222, 226 and L2 cache 114 are organized as 4-way set associative caches. A random cache replacement strategy has been chosen for the replacement algorithm of the 4-way set associative caches. In this embodiment, the caches do not support cache entry locking except through the RAM-set.

Table 2 includes a listing of the various cache and RAM control operations that can be invoked by the processors in the megacell of the present embodiment. In this embodiment, all operations on an entry operate on segments, and there are four segment per entry, as discussed above.

A state machine in cache controller circuitry 530 executes a requested control operation, as indicated by a control word.

In another embodiment, the control operations can be invoked by executing an instruction that invokes a hardware or software trap response. As part of this trap response, a sequence of instructions can be executed or a control word can be written to selected address, for example. In another embodiment, one of the processors may include instruction decoding and an internal state machine(s) to perform a TLB or Cache control operation in response to executing certain instructions which may include parameters to specify the requested operation.

Table 2—Cache and RAM Control Operations
(C: Operation on the Cache, RS: Operation on RAM-set, R: Operation on RAM

TABLE 2

Cache and RAM Control Operations
(C: operation on the cache, RS: operation on RAM-set, R: operation on RAM)

| Function | | Software view (memory mapped/co-proc) |
|---|---|---|
| Flush_entry (address) | C/RS | Flush the entry[1], whose address matches the provided address or a Range of addresses, if End has been set previously. Flush-range instruction is made of two consecutive instructions Set_End_addr(address) + Flush_entry (address). |
| Flush_all_entry_of_task_ID(task_ID) | C | Flush all entries matching to the current taskID in the cache but not in the RAM-set |
| Flush_all_entry_of_R_ID(task_ID) | C | Flush all entries matching to the current R_ID in the cache but not in the RAM-set |
| Flush_all | C | Flush all entries in the cache but not in RAM-set |
| Flush_all_shared | C | Flush all entries marked as shared |
| Flush_all_task_ID_shared(task_ID) | C | Flush all entries matching the current taskID and marked as shared |
| Flush_all_task_ID_not_shared (task_ID) | C | Flush all entries matching the current taskID and marked as not shared |
| Clean_entry (address) | C/RS | Clean the entry[1], whose address matches the provided address or a Range of address if End has been set previously. Clean-range instruction is made of two consecutive instructions Set_End_addr(address) + Clean_entry (address). |
| Clean_all_entry_of_taskID(task_ID) | C | Clean all entries matching to the current taskID in the cache but not in the RAM-set |
| Clean_all_entry_Of_R_ID(task_ID) | C | Clean all entries matching to the current R_ID in the cache but not in the RAM-set |
| Clean_all | C | Clean all entries in the cache but not in RAM-set |
| Clean_all_shared | C | Clean entries marked as shared |
| Clean_all_task_ID_shared(task_ID) | C | Clean all entries matching the current taskID and marked as shared |
| Clean_all_taskID_not_shared(Task_ | C | Clean all entries matching the current taskID and marked as not |

TABLE 2-continued

Cache and RAM Control Operations
(C: operation on the cache, RS: operation on RAM-set, R: operation on RAM)

| Function | | Software view (memory mapped/co-proc) |
|---|---|---|
| ID) | | shared |
| Clean&Flush_single_entry(address) | C/RS | Clean and flush the entry[1], whose address matches the provided address or a Range of address if End has been set previously. Clean-range instruction is made of two consecutive instructions Set_End_addr(address) + Clean_entry (address). |
| Clean&flush_all_entry_of_taskID (Task_ID) | C | Clean and flush all entries matching to the current taskID in the cache but not in the RAM-set |
| Clean&flush_all_entry_of_R_ID (Task_ID) | C | Clean and flush all entries matching to the current R_ID in the cache but not in the RAM-set |
| Clean&flush_all | C | Clean and flush all entries in the cache but not in RAM-set |
| Clean&flush_all_shared | C | Clean and flush entries marked as shared |
| Clean&flush_all_taskID_shared (task_ID) | C | Clean and flush all entries matching the current taskID and marked as shared |
| Clean&flush_all_taskID_not_shared (task_ID) | C | Clean and flush all entries matching the current taskID and marked as not shared |
| Set_RAM_Set_Base_addr(RAM-setID) | RS/R | Set new RAM-set base address, set VG and clear all VI and set End to last RAM-set address by default preparing the full RAM-set loading. In that case no need to write the END address before writing the start address to load the RAM-set |
| Set_End_Addr (address) | C/RS | Set end address of the next block load and set the RAM-set controller in block fill mode. |
| Set_start_addr (address) | C/RS | Set start address of a block and initiates the loading of this block |
| Flush_RAM-set (RAM-set_ID) | RS/R | Clear VG and all VI of the selected RAM-set |

FIG. 6 is a more detailed block diagram illustrating various interconnections between processors 1200(0-n) and L2 cache 1220, representative of the L2 cache of FIG. 1. A data bus 1202(n), physical address bus 1204(n), resource ID signals 1206(n), and task ID signals 1208(n) provided by each processor 1200(n) for each L2 request. Recall from earlier description that TLBs associated with each requester provides the physical address and resource/task ID signals for each request. Traffic controller 1210 provides request priority selection and sends the highest priority request to L2 cache 1220 using data bus 1202, physical address bus 1204, resource ID signals 1206, and task ID signals 1208 to completely identify each request. In the present embodiment, TLBs are used to convert virtual address to physical address and also respond to task ID and resource ID, as described with earlier.

In another embodiment, a TLB may not be needed and will therefore not provide the physical address and resource/task ID signals for each request. In that case, address signals and resource/task ID signals are provided directly from registers associated with the requesting device, for example.

Figure 7:
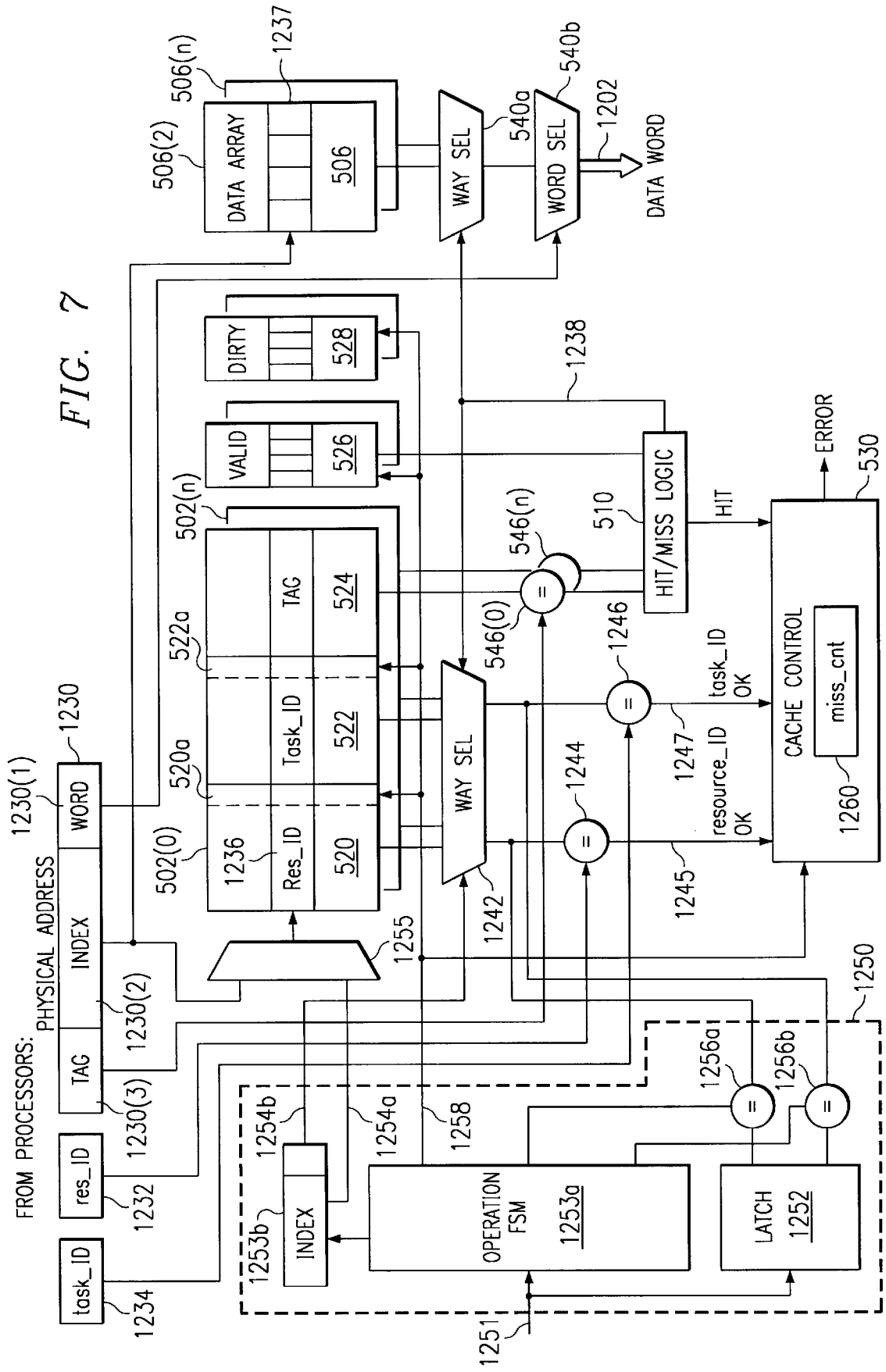
FIG. 7 is a more detailed block diagram of the L2 cache of FIG. 6, illustrating tag circuitry with task ID and resource ID fields.

FIG. 7 is a block diagram of the L2 cache of FIG. 6, illustrating tag circuitry with task ID and resource ID fields. As discussed earlier, the shared multiprocessor L2_cache architecture has a task_ID field 522 and Resource_ID field 520 to identify the device using the corresponding resource and task. Adding these qualifier fields to the shared level-2 cache identifies all entries belonging to a task and/or to resource. This provides improved system safety and control.

For each memory access request, a proffered physical address 1230 received on address bus 1204 is treated has having a tag portion 1230(3), an index portion 1230(2) and a word portion 1230(1), as is commonly understood for set associative caches. In addition, a resource ID field 1232 is received on bus 1206 and a task ID 1234 is received on bus 1208. Index portion 1230(2) is used to select a tag line 1236 from each tag array 502(n) and associated data line 1237 from each data array 506(n). Separate comparators 546(n) then compare tag portion 1230(3) to tag field 524 from each tag array 502(n). Note that only two arrays are shown, but for a four way set-associative cache, there are actually four arrays. Hit/miss logic 510 reports a hit if a match occurs as indicated by any of comparators 546(n) and if the entry is marked valid, as indicated by valid field 526. Select signals 1238 then are asserted to way-select circuitry 540a to select one data line 1237 according to which tag array matched the tag portion of the proffered address, and word portion 1230(1) causes word select circuitry 540b to select an appropriate word from the selected data line 1237 and provide it on data bus 1202.

Way select circuitry 1242 also responds to select signals 1238 to select one resource ID field 520 and one task ID field 522 according to which tag array matched the tag portion of the proffered address. Comparators 1244 and 1246 then compare the proffered resource ID 1232 and task ID 1234. Resource OK signal 1245 and task OK signal 1247 are asserted if the respective fields match. If one or the other proffered fields 1232, 1234 do not match selected fields 520, 522, then control circuitry 530 asserts an error signal.

Thus, advantageously, system integrity is improved by assuring that each access to a shared cache is constrained by resource ID and task ID.

Each resource ID entry and task ID entry is validated before being acted upon. If either or both qualifier fields for a given entry are not valid, then it is ignored. In the present embodiment, a valid bit is included in each tag field, as indicated at 520a and 522a. Each qualifier field is initialized when a miss occurs and data is fetched from L3 memory. The valid bits associated with the proffered task ID and resource ID are provided with the cache access request by the TLB that provides the physical address. During a hit, comparators 1244 and 1246 also examine valid bits 520a, 522a associated with a selected tag entry. If task ID valid bit 522a indicates an invalid task-ID entry, then task OK signal 1247 is asserted to ignore the task field for that access. Likewise, if resource ID valid bit 520a indicates an invalid resource-ID entry, then resource OK signal 1245 is asserted to ignore the resource field for that access.

In another embodiment, instead of providing task ID valid bit 522a and resource ID valid bit 520a, the contents of a field entry is set to a select value, such as all ones, to indicate an invalid entry. In another embodiment, qualifier fields in the tag array do not have an associated validation feature; instead, the validation bits provided by the TLB with the cache request are used directly to validate a qualifier field comparison.

Referring still to FIG. 7, in a dynamic system environment and at fortifier in a multi-processor system with shared memory cache, it becomes advantageous due to the cache size to have selective control over the cache to improve performance and reduce power consumption. Task-ID 522 and resource-ID 520 have been added to the TAG array as a qualifier field for cache operations of Table 2, such as flush (invalidate), clean or even lock/unlock. All entries of the shared system cache belonging to a task or respectively to one of the system resource (CPU, coprocessors, etc.) can be identified within a single cache command, as illustrated in Table 2. Advantageously, a task which ends or is terminated can be removed and thereby create free spaces in the cache. This minimizes eviction of useful entries of active tasks and thereby reduces power consumption.

Control circuitry 1250 receives an operation command on control port 1251 from one of the processors in the megacell. The command specifies a particular qualifier value that is to be used for the operation and this is stored in storage circuitry 1252. The control circuitry has outputs 1254a,b connected to the tag array to select a tag entry. Operation command finite state machine (FSM) 1253a and index counter 1253b operate together to sequentially select each and every tag entry in tag array 502(0-n) by using most significant bits 1254a as an index value into the tag array. The least significant bits 1254b of counter 1253b are connected to way-select mux 1242 to sequentially select each tag array of a multiple set array. Comparators 1256a,b are connected to receive the qualifier fields of the selected tag entry and compare them to the specified qualifier value(s) in latch 1252. If there is a match, then appropriate modification signals 1258 are asserted to modify the selected tag entry according to the operation command.

For example, on detection of the command "flush_all_entry_related_to_task_ID" issued by the MPU, a hardware counter 1253b is incremented to search all the L2_cache and the command flushes all entries belonging to the given task identifier (task-ID) or/and to the given resource identifier (R-ID) by turning off an associated valid bit 526. At each iteration of the hardware loop, the task-ID, or/and respectively the R-ID, field is compared with the task-ID, or/and respectively the R-ID, provided through the command. In case of match, the entry is flushed out. Similarly, the system supports clean and clean&flush operations based on task-ID field and R-ID field. A "clean" operation writes an entry out to backup memory if the associated dirty bit 528 is set.

In another embodiment, this fast hardware looping mechanism is also applied to a one-bit field called "shared". Similarly, all entries marked as "shared" can be cleaned or flushed out through a single command. A shared bit is included with each tag entry in the tag array. Each proffered request includes a shared value that is provided by a TLB that translates the address for each request.

In another embodiment, other types of qualifier fields may be included within the tag entry.

In an embodiment that has qualifier field validation, such as a valid bit or invalid value, for example, an invalid qualifier field is ignored. Therefore, tag entries with invalid entries will be ignored. However, in this case, a command to modify tag entries with invalid qualifiers may be provided.

In another embodiment, a task ID could also be applied to an L1 cache to allow cleaning and flushing of an L1 cache based on task ID; however, for a small cache size there may not be sufficient benefit.

The master CPU, or any CPUs in the system within their R-ID limits, can initiate these commands. Ordinary accesses, resulting from an L1-miss, will stall these commands. After an L1 miss is satisfied, the stalled command is then automatically resumed.

In this embodiment, a hardware loop controlled by a single command is provided by state machine 1253a under control of the MPU to clean or flush all entries of a given task. In another embodiment, a similar state machine can be under control of the DSP or an external host processor. Alternatively, control circuitry can be provided to perform a flush operation in a simultaneous manner for all entries, rather than operating in a looping manner, using a content addressable memory circuit, for example. Likewise, multiple entries could be cleaned in parallel by providing sufficient write buffer space.

Figure 8A:
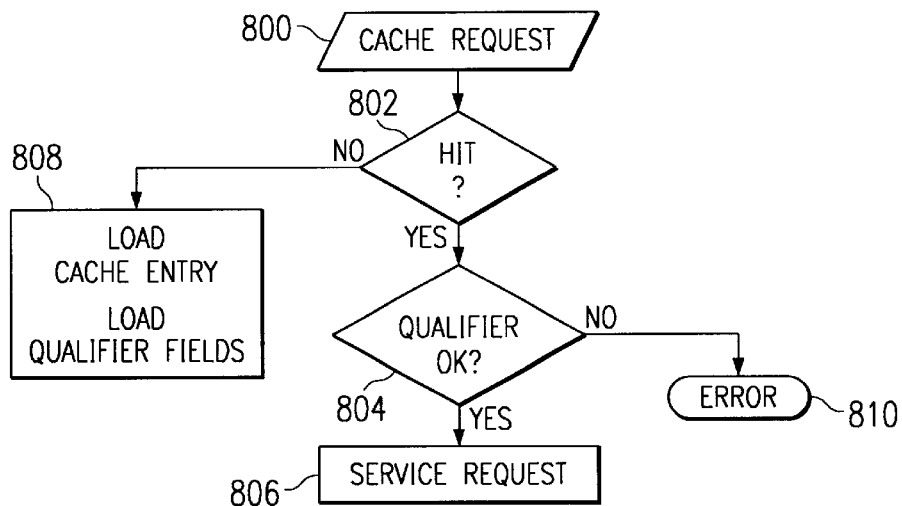
FIG. 8A is a flow chart describing the operation of task ID and resource ID qualifier fields.

FIG. 8A is a flow chart describing the operation of task ID and resource ID qualifier fields for a cache having a plurality of lines with an associated plurality of tags. In step 800, a request is received for access to the cache on a request port. The proffered request includes an address value representative of an address of a requested data and qualifier values for task ID and resource ID.

In step 802, a determination is made if data corresponding to the address value provided by request is present in the cache by examining a selected tag entry. In a set associative cache, a tag entry is selected in response an index portion 1230(2) of the proffered address. For a multi-set cache, multiple comparators compare proffered tag portion 1230(0) to each selected tag entry for each set. A hit is indicated if an address field of one of the selected tags match tag portion 1230(3) of the proffered address. If the address does not match, then a miss is indicated.

In step 808, if a miss is indicated, then data corresponding to the proffered address value is stored in a line of the cache associated with the selected tag. A tag portion of the proffered address is stored in the address field of the selected tag, and the proffered resource ID and task ID values are stored in qualifier fields of the selected tag. The request is then serviced by providing data that has been fetched from L3 memory if the request was a read or by storing data included with the request if the request was a write.

In step 804, if a hit is indicated, then qualifier values proffered with the request are compared to respective qualifier fields of the matching tag entry. If both the proffered resource ID value and the proffered task ID value match the respective fields, then the access is qualified. If one or both qualifier values do not the respective qualifier fields, then an error is indicated in step 810. In step 804, the validity of the qualifier fields is also checked by examining a valid indicator associated with each qualifier field. If a qualifier field is not valid, then it is ignored.

In step 806, a qualified request is serviced by providing data that has been obtained from the cache if the request was a read or by storing data included with the request if the request was a write.

Figure 8B:
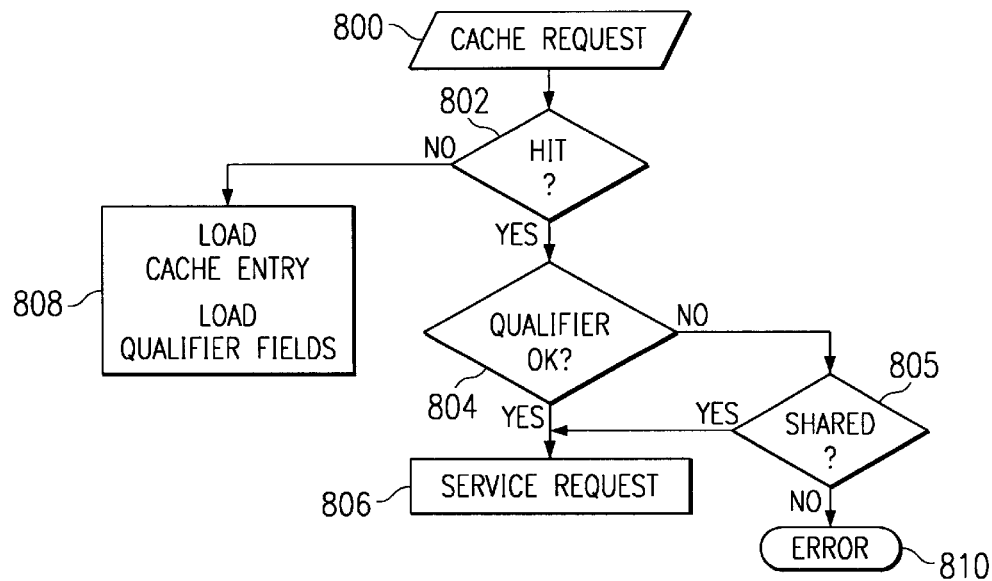
FIG. 8B is a flow chart describing the operation of task ID and resource ID qualifier fields with an additional shared qualifier field.

FIG. 8B is a flow chart describing the operation of task ID and resource ID qualifier fields with an additional shared qualifier field in another embodiment. In this alternative embodiment, the steps are the same as in FIG. 8A except that if step 804 indicates a qualifier mismatch, then step 805 consults a shared bit that is provided by a TLB along with the cache access request. If the shared bit indicates this address is being shared by tasks or resources, then the qualifier mismatch from step 804 is ignored and the request is serviced in step 806. Otherwise, an error is indicated in step 810.

In yet another embodiment, step 810 does not report an error. Instead, if a qualifier value does not match a respective qualifier field, then the requested is treated as a miss and step 808 is performed. In this case, a status flag may be set to indicate qualifier field violation has occurred.

Figure 9:
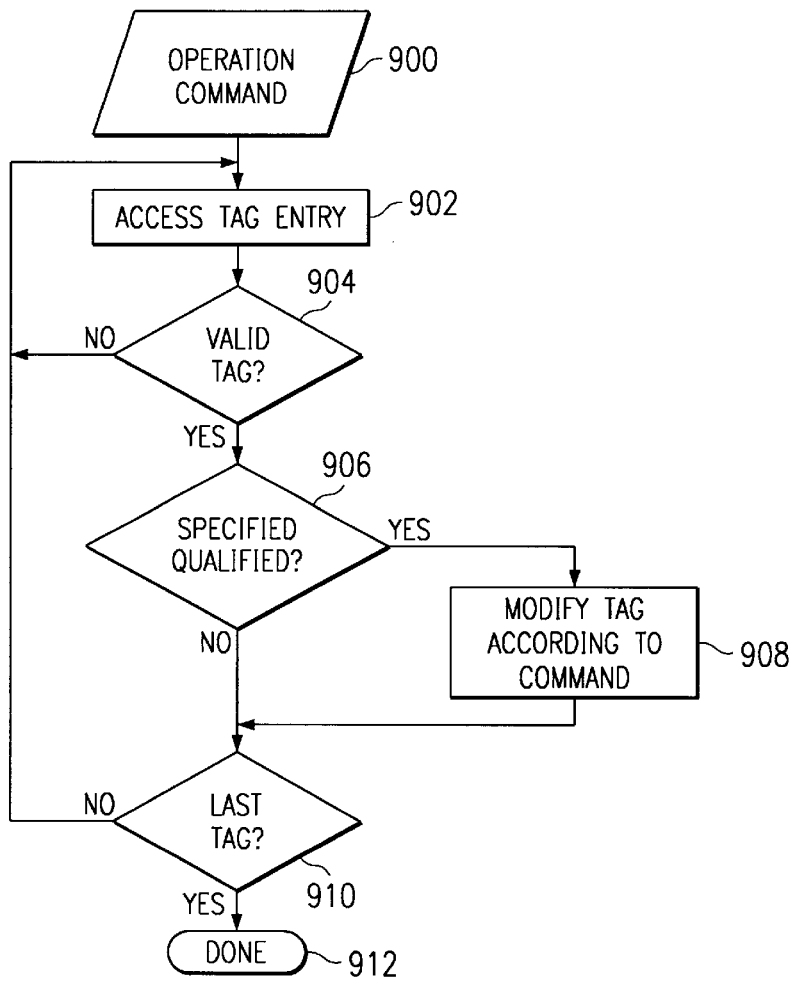
FIG. 9 is a flow chart for an operation command on the cache that is responsive to qualifier fields in the cache tag entries.

FIG. 9 is a flow chart for an operation command on the cache that is responsive to qualifier fields in the cache tag entries. In step 900, an operation command is received from control processor 102. As discussed earlier, operation commands are described in Table 2. One or more specified qualifier fields are received with the command. An operation command is generally performed after the cache has been in operation for a period of time and the tag entries have been filed, as described in FIG. 8.

In step 902, a selected tag entry is accessed. Upon receipt of the operation command, an index counter is initialized with a first index value, typically zero. Thus, a tag entry corresponding to index zero is accessed.

In step 904, a valid bit 526 associated with the selected tag entry is checked. If the tag entry is invalid, then the process returns to step 902 and accesses the next tag. If the tag is valid, then the qualifier field(s) are compared to the specified qualifier provided with the operation command in step 906. In this embodiment, either or both of the resource ID and task ID fields can be specified to control the operation. In step 906, the validity of the qualifier fields is also checked by examining a valid indicator associated with each qualifier field. If a qualifier field is not valid, then it is ignored.

In step 908, if the qualifier field(s) match, then the tag entry is modified in accordance with the operation. For example, if the operation is "flush_all_entry_of_task_ID(task_ID)," then all valid bits 526 for the selected tag entry are turned off. For another example, it the operation is "Clean_all_entry_of_taskID(task_ID)," then a modification signal is asserted to cause control circuitry of the cache to perform a clean cycle the selected tag/data entry by examining dirty bits corresponding to the selected entry and writing "dirty" data to main memory. The dirty bit(s) is then turned off.

In step 910, a check is made to determine if the last tag has been accessed. The loop is repeated until all tags have been checked and all tag entries that have qualifier fields that match the specified qualifier value have been modified according to the specified operation. In this embodiment, a finite state machine is configured with the index value size of the tag array. This is used to determine the last tag. In another embodiment, the first and last tag value may be configured under control of software so that a software controlled range of tags can be operated on.

Digital System Embodiment

Figure 10:
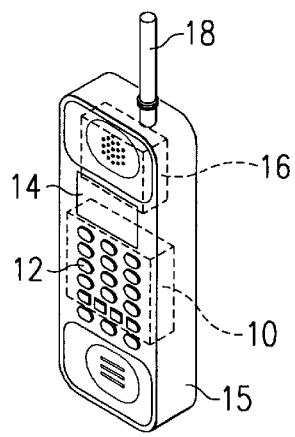
FIG. 10 is a representation of a telecommunications device incorporating an embodiment of the present invention.

FIG. 10 illustrates an exemplary implementation of an example of such an integrated circuit in a mobile telecommunications device, such as a mobile telephone with integrated keyboard 12 and display 14. As shown in FIG. 10, the digital system 10 with a megacell according to FIG. 2 is connected to the keyboard 12, where appropriate via a keyboard adapter (not shown), to the display 14, where appropriate via a display adapter (not shown) and to radio frequency (RF) circuitry 16. The RF circuitry 16 is connected to an aerial 18.

It is contemplated, of course, that many other types of communications systems and computer systems may also benefit from the present invention, particularly those relying on battery power. Examples of such other computer systems include personal digital assistants (PDAs) portable computers, smart phones, web phones, and the like. As power dissipation is also of concern in desktop and line-powered computer systems and micro-controller application, particularly from a reliability standpoint, it is also contemplated that the present invention may also provide benefits to such line-powered systems.

Fabrication of the digital systems disclosed herein involves multiple steps of implanting various amounts of impurities into a semiconductor substrate and diffusing the impurities to selected depths within the substrate to form transistor devices. Masks are formed to control the placement of the impurities. Multiple layers of conductive material and insulative material are deposited and etched to interconnect the various devices. These steps are performed in a clean room environment.

A significant portion of the cost of producing the data processing device involves testing. While in wafer form, individual devices are biased to an operational state and probe tested for basic operational functionality. The wafer is then separated into individual dice which may be sold as bare die or packaged. After packaging, finished parts are biased into an operational state and tested for operational functionality.

The digital systems disclosed herein contain hardware extensions for advanced debugging features. These assist in the development of an application system. Since these capabilities are part of the megacell itself, they are available utilizing only a JTAG interface with extended operating mode extensions. They provide simple, inexpensive, and speed independent access to the core for sophisticated debugging and economical system development, without requiring the costly cabling and access to processor pins required by traditional emulator systems or intruding on system resources.

As used herein, the terms "applied," "connected," and "connection" mean electrically connected, including where additional elements may be in the electrical connection path. "Associated" means a controlling relationship, such as a memory resource that is controlled by an associated port. The terms assert, assertion, de-assert, de-assertion, negate and negation are used to avoid confusion when dealing with a mixture of active high and active low signals. Assert and assertion are used to indicate that a signal is rendered active, or logically true. De-assert, de-assertion, negate, and negation are used to indicate that a signal is rendered inactive, or logically false.

While the invention has been described with reference to illustrative embodiments, this description is not intended to be construed in a limiting sense. Various other embodiments of the invention will be apparent to persons skilled in the art upon reference to this description. For example, in another embodiment, the L2 cache may be a simple cache that does not include RAM-set or configurable features while still providing qualifier fields for cache operation commands. The cache may be positioned at a level other than L2. The cache may have a different set organization with a different number of segments per line, for example. The cache may have other than two qualifier fields in each tag entry.

It is therefore contemplated that the appended claims will cover any such modifications of the embodiments as fall within the true scope and spirit of the invention.

What is claimed is:

1. A method of operating a digital system having a cache, the cache having a plurality of lines with an associated plurality of tags, the method comprising the steps of:

loading data into a first plurality of lines in the cache in response to a second plurality of data requests and setting each tag associated with the first plurality of lines to a valid state;

storing a qualifier value in each tag that is in a valid state, wherein the qualifier value specifies a usage characteristic of data stored in an associated line of the first plurality of lines of the cache; and modifying each tag that contains a specified qualifier value in response to a cache modification command specifying a qualifier value.

2. The method according to claim 1, wherein the step of modifying comprises the steps of:

receiving a cache modification command that specifies a first operation and a first specified qualifier value;

examining a first tag to determine if it is in a valid state;

comparing the qualifier value stored in the first tag if it is in a valid state to the first specified qualifier value;

modifying the first tag according to the first operation if the value of the qualifier value stored in the first tag matches the first specified qualifier value; and repeating the steps of examining, comparing and modifying for each of the plurality of tags.

3. The method according to claim 1, wherein the qualifier value represents a task-ID indicative of a software task that requested the associated data.

4. The method according to claim 1, wherein the qualifier value represents a resource-ID indicative of a hardware resource that requested the data.

5. The method according to claim 1, further comprising:

storing for each cache line a valid indicator indicating whether the cache line is valid or invalid;

said cache modification command includes a flush current identifier command specifying a second identifier value; and said step of modifying the contents of the cache qualified by the second qualifier value is responsive to a flush current identifier command to change the valid indicator to indicate invalid for all cache lines having a qualifier field matching the second identifier value.

6. The method according to claim 1, further comprising:

storing for each cache line a dirty indicator indicating clean if the cache line has not been written to since recall from a higher level memory and dirty if the cache line has been written to since recall from a higher level memory;

said cache modification command includes a clean current identifier command specifying a second identifier value; and said step of modifying the contents of the cache qualified by the second qualifier value is responsive to a clean current identifier command to writeback to higher level memory cache lines having a qualifier field matching the second identifier value and a dirty indicator indicating dirty and thereafter to change the dirty indicator to indicate clean for the matching cache lines.

7. The method according to claim 1, further comprising:

storing for each cache line a dirty indicator indicating clean if the cache line has not been written to since recall from a higher level memory and dirty if the cache line has been written to since recall from a higher level memory;

storing for each cache line a valid indicator indicating whether the cache line is valid or invalid;

said cache modification command includes a clean and flush current identifier command specifying a second identifier value; and said step of modifying the contents of the cache qualified by the second qualifier value is responsive to a clean and flush current identifier command to writeback to higher level memory cache lines having a qualifier field matching the second identifier value and an dirty indicator indicating dirty and thereafter to change the valid indicator to indicate invalid for the matching cache lines.

8. The method according to claim 1, further comprising:

storing for each cache line a shared indicator indicating the cache line is shared among a plurality of qualifier values or not shared;

storing for each cache line a valid indicator indicating whether the cache line is valid or invalid;

said cache modification command includes a flush current identifier shared command specifying a second identifier value; and said step of modifying the contents of the cache qualified by the second qualifier value is responsive to a flush current identifier shared command to change the valid indicator to indicate invalid for all cache lines having a qualifier field matching the second identifier value and a shared indicator indicating shared.

9. The method according to claim 1, further comprising:

storing for each cache line a shared indicator indicating the cache line is shared among a plurality of qualifier values or not shared;

storing for each cache line a dirty indicator indicating clean if the cache line has not been written to since recall from a higher level memory and dirty if the cache line has been written to since recall from a higher level memory;

said cache modification command includes a clean current identifier shared command specifying a second identifier value; and said step of modifying the contents of the cache qualified by the second qualifier value is responsive to a clean current identifier shared command to writeback to higher level memory cache lines having a qualifier field matching the second identifier value, a dirty indicator indicating dirty and a shared indicator indicating shared and thereafter to change the dirty indicator to indicate clean for the matching cache lines.

10. The method according to claim 1, further comprising:

storing for each cache line a shared indicator indicating the cache line is shared among a plurality of qualifier values or not shared;

storing for each cache line a dirty indicator indicating clean if the cache line has not been written to since recall from a higher level memory and dirty if the cache line has been written to since recall from a higher level memory;

storing for each cache line a valid indicator indicating whether the cache line is valid or invalid;

said cache modification command includes a clean and flush current identifier shared command specifying a second identifier value; and said step of modifying the contents of the cache qualified by the second qualifier value is responsive to a clean and flush current identifier shared command to writeback to higher level memory cache lines having a qualifier field matching the second identifier value, a dirty indicator indicating dirty and a shared indicator indicating shared and thereafter to change the valid indicator to indicate invalid for the matching cache lines.

11. The method according to claim 1, further comprising:
storing for each cache line a shared indicator indicating the cache line is shared among a plurality of qualifier values or not shared;
storing for each cache line a valid indicator indicating whether the cache line is valid or invalid;
said cache modification command includes a flush current identifier not shared command specifying a second identifier value; and
said step of modifying the contents of the cache qualified by the second qualifier value is responsive to a flush current identifier not shared command to change the valid indicator to indicate invalid for all cache lines having a qualifier field matching the second identifier value and a shared indicator indicating not shared.

12. The method according to claim 1, further comprising:
storing for each cache line a shared indicator indicating the cache line is shared among a plurality of qualifier values or not shared;
storing for each cache line a dirty indicator indicating clean if the cache line has not been written to since recall from a higher level memory and dirty if the cache line has been written to since recall from a higher level memory;
said cache modification command includes a clean current identifier not shared command specifying a second identifier value; and
said step of modifying the contents of the cache qualified by the second qualifier value is responsive to a clean current identifier not shared command to writeback to higher level memory cache lines having a qualifier field matching the second identifier value, a dirty indicator indicating dirty and a shared indicator indicating not shared and thereafter to change the dirty indicator to indicate clean for the matching cache lines.

13. The method according to claim 1, further comprising:
storing for each cache line a shared indicator indicating the cache line is shared among a plurality of qualifier values or not shared;
storing for each cache line a dirty indicator indicating clean if the cache line has not been written to since recall from a higher level memory and dirty if the cache line has been written to since recall from a higher level memory;
storing for each cache line a valid indicator indicating whether the cache line is valid or invalid;
said cache modification command includes a clean and flush current identifier not shared command specifying a second identifier value; and
said step of modifying the contents of the cache qualified by the second qualifier value is responsive to a clean and flush current identifier not shared command to writeback to higher level memory cache lines having a qualifier field matching the second identifier value, a dirty indicator indicating dirty and a shared indicator indicating not shared and thereafter to change the valid indicator to indicate invalid for the matching cache lines.

14. The method according to claim 1, further comprising:
stalling modification of each tag that contains a specified qualifier value upon an ordinary access to the cache; and
resuming a stalled modification of each tag that contains a specified qualifier value upon completion of an ordinary access to the cache.

15. A digital system having a cache, wherein the cache comprises:
a data array having a plurality of lines for holding data;
a tag array having a plurality of lines for holding a plurality of tags, each line of the tag array being associated with a particular line of the data array, wherein each line of the tag array comprises an address field and first qualifier field;
a control port receiving a cache modification command specifying a qualifier value; and
control circuitry having a first output connected to the tag array to select a tag from the plurality of tags, the control circuitry connected to receive the first qualifier field of the selected tag, and having a second output connected to provide a modification signal to the selected tag in response to a cache modification command received on the control port specifying a qualifier value matching the first qualifier field of the selected tag.

16. The digital system according to claim 15, wherein the control circuitry comprises:
storage circuitry operable to store a qualifier value specified in a cache modification command in response to a cache modification command operation command received on the control port;
a comparator with a first input connected to the tag array to receive the first qualifier field, and with a second input connected to the storage circuitry to receive the specified qualifier value of the cache modification command, and with an output operable to indicate if the first qualifier field is equal to the specified qualifier value; and
wherein the modification signal is responsive to the output of the comparator.

17. The digital system according to claim 16, wherein;
each line of the tag array comprises at least an additional second qualifier field;
each cache modification command further specifies second a qualifier value;
the storage circuitry is further operable to store the second qualifier value in response to a cache modification command received on the control port;
wherein the control circuitry is connected to receive the second qualifier field and further includes a second comparator with a first input connected to the tag array to receive the second qualifier field, and with a second input connected to the storage circuitry to receive the specified second qualifier value of the cache modification command, and with an output operable to indicate if the second qualifier field is equal to the specified second qualifier value; and
wherein the modification signal is responsive to the output of the second comparator.

18. The digital system according to claim 15, wherein:
each line of the tag array further stores a valid indicator indicating whether the corresponding line of the data array is valid or invalid;
the cache modification command includes a flush current identifier command specifying a second identifier value; and
the cache control circuitry responds to a flush current identifier command by changing the valid indicator to indicate invalid for all lines of the tag array having a qualifier field matching the second identifier value.

19. The digital system according to claim 15, wherein:
each line of the tag array further stores a dirty indicator indicating clean if the corresponding line of the data array has not been written to since recall from a higher level memory and dirty if the corresponding line of the data array has been written to since recall from a higher level memory;
the cache modification command includes a clean current identifier command specifying a second identifier value; and
the cache control circuitry responds to a clean current identifier command by writing back to higher level memory lines in the data array in which a qualifier field in the corresponding line of the tag array matches the second identifier value and the dirty indicator indicates dirty and thereafter changing the dirty indicator to indicate clean for the corresponding lines of the tag array.

20. The digital system according to claim 15, wherein:
each line of the tag array further stores a dirty indicator indicating clean if the corresponding line of the data array has not been written to since recall from a higher level memory and dirty if the corresponding line of the data array has been written to since recall from a higher level memory and stores a valid indicator indicating whether the corresponding line of the data array is valid or invalid;
the cache modification command includes a clean and flush current identifier command specifying a second identifier value; and
the cache control circuitry responds to a clean and flush current identifier command by writing back to higher level memory lines of the data array in which a qualifier field in the corresponding line of the tag array matches the second identifier value and a dirty indicator indicates dirty and thereafter changing the valid indicator to indicate invalid for the matching lines of the tag array.

21. The digital system according claim 15, wherein:
each line of the tag array further stores a shared indicator indicating the corresponding line of the data array is shared among a plurality of qualifier values or not shared and stores a valid indicator indicating whether the corresponding line of the data array is valid or invalid;
the cache modification command includes a flush current identifier shared command specifying a second identifier value; and
the cache control circuitry responds to a flush current identifier shared command by changing the valid indicator to indicate invalid for all lines of the tag array having a qualifier field matching the second identifier value and a shared indicator indicating shared.

22. The digital system according to claim 15, wherein:
each line of the tag array further stores a shared indicator indicating the corresponding line of the data array is shared among a plurality of qualifier values or not shared and stores a dirty indicator indicating clean if the corresponding line of the data array has not been written to since recall from a higher level memory and dirty if the corresponding line of the data array has been written to since recall from a higher level memory;
the cache modification command includes a clean current identifier shared command specifying a second identifier value; and
the cache control circuitry responds to a clean current identifier shared command by writing back to higher level memory lines of the data array in which a qualifier field of the corresponding line of the tag array matches the second identifier value, a dirty indicator indicates dirty and a shared indicator indicates shared and thereafter changing the dirty indicator to indicate clean for the matching lines of the tag array.

23. The digital system according to claim 15, wherein:
each line of the tag array further stores a shared indicator indicating the corresponding line of the data array is shared among a plurality of qualifier values or not shared, stores for each line of the tag array a dirty indicator indicating clean if the corresponding line of the data array has not been written to since recall from a higher level memory and dirty if the corresponding line of the data array has been written to since recall from a higher level memory and stores a valid indicator indicating whether the corresponding line of the data array is valid or invalid;
the cache modification command includes a clean and flush current identifier shared command specifying a second identifier value; and
the cache control circuitry responds to a clean and flush current identifier shared command by writing back to higher level memory lines of the data array in which a qualifier field of the corresponding line of the tag array matches the second identifier value, a dirty indicator indicates dirty and a shared indicator indicates shared and thereafter changing the valid indicator to indicate invalid for the matching lines of the tag array.

24. The digital system according to claim 15, wherein:
each line of the tag array further stores a shared indicator indicating the corresponding line of the data array is shared among a plurality of qualifier values or not shared and stores a valid indicator indicating whether the corresponding line of the data array is valid or invalid;
the cache modification command includes a flush current identifier not shared command specifying a second identifier value; and
the cache control circuitry responds to a flush current identifier not shared command by changing the valid indicator to indicate invalid for all lines of the tag array having a qualifier field matching the second identifier value and a shared indicator indicating not shared.

25. The digital system according to claim 15, wherein:
each line of the tag array further stores a shared indicator indicating the corresponding line of the data array is shared among a plurality of qualifier values or not shared and stores a dirty indicator indicating clean if the corresponding line of the data array has not been written to since recall from a higher level memory and dirty if the corresponding line of the data array has been written to since recall from a higher level memory;
the cache modification command includes a clean current identifier not shared command specifying a second identifier value; and
the cache control circuitry responds to a clean current identifier not shared command by writing back to higher level memory lines of the data array in which a qualifier field of the corresponding line of the tag array matches the second identifier value, a dirty indicator indicates dirty and a shared indicator indicates not shared and thereafter changing the dirty indicator to indicate clean for the matching lines of the tag array.

26. The digital system according to claim 15, wherein:

each line of the tag array further stores a shared indicator indicating the corresponding line of the data array is shared among a plurality of qualifier values or not shared, stores for each line of the tag array a dirty indicator indicating clean if the corresponding line of the data array has not been written to since recall from a higher level memory and dirty if the corresponding line of the data array has been written to since recall from a higher level memory and stores a valid indicator indicating whether the corresponding line of the data array is valid or invalid;

the cache modification command includes a clean and flush current identifier not shared command specifying a second identifier value; and the cache control circuitry responds to a clean and flush current identifier not shared command by writing back to higher level memory lines of the data array in which a qualifier field of the corresponding line of the tag array matches the second identifier value, a dirty indicator indicates dirty and a shared indicator indicates not shared and thereafter changing the valid indicator to indicate invalid for the matching lines of the tag array.

27. The digital system according to claim 15, wherein:

the control circuitry is further operative to stall modification of each tag that contains a specified qualifier value upon an ordinary access to the cache, and resume a stalled modification of each tag that contains a specified qualifier value upon completion of an ordinary access to the cache.

\* \* \* \* \*